(12) United States Patent
Park et al.

(10) Patent No.: US 11,778,146 B2
(45) Date of Patent: Oct. 3, 2023

(54) APPARATUS AND METHOD FOR AUTHENTICATING NETWORK VIDEO RECORDER SECURITY

(71) Applicant: DUDU Information Technologies, Inc., Seoul (KR)

(72) Inventors: Young Sun Park, Seoul (KR); Gyeng Che Cho, Gyeonggi-do (KR); Su Man Nam, Gyeonggi-do (KR); Jun Geol Kim, Gyeonggi-do (KR); Jin Woo Lee, Seoul (KR)

(73) Assignee: DUDU Information Technologies, Inc., Seoul (KR)

( * ) Notice: Subject to any disclaimer, the term of this patent is extended or adjusted under 35 U.S.C. 154(b) by 93 days.

(21) Appl. No.: 17/572,646

(22) Filed: Jan. 11, 2022

(65) Prior Publication Data
US 2022/0311973 A1 Sep. 29, 2022

(30) Foreign Application Priority Data
Mar. 23, 2021 (KR) .......... 10-2021-0037196

(51) Int. Cl.
*H04L 29/06* (2006.01)
*G06F 21/00* (2013.01)
(Continued)

(52) U.S. Cl.
CPC .......... *H04N 7/181* (2013.01); *H04L 9/0662* (2013.01); *H04L 9/088* (2013.01); *H04L 9/0825* (2013.01); *H04L 9/3242* (2013.01)

(58) Field of Classification Search
None
See application file for complete search history.

(56) References Cited

U.S. PATENT DOCUMENTS 5,677,952 A * 10/1997 Blakley, III ............ G06F 21/72
380/46
6,901,145 B1 * 5/2005 Bohannon ............. H04L 9/3231
713/168
(Continued)

FOREIGN PATENT DOCUMENTS

KR 101750676 B1 6/2017
KR 101912403 B1 12/2018
(Continued)

*Primary Examiner* — Lisa C Lewis
(74) *Attorney, Agent, or Firm* — Nicholas Park

(57) ABSTRACT

Provided is a security authentication method of a network video recorder (NVR) including assigning a terminal unique index to each of pseudo-random functions included in a pseudo-random function set using terminal information; transmitting a session key having a predetermined expiry time and the pseudo-random function set with the assigned terminal unique index to a terminal; calculating a first terminal unique index for authenticating a first message using a predetermined bitstream of the first message received from the terminal; selecting a first pseudo-random function for authenticating the first message using the calculated first terminal unique index; generating a first independent private key of the terminal for authenticating the first message by inputting the session key and a MAC address of the terminal to the first pseudo-random function; and generating a message authentication code for the first message using the first independent private key and authenticating the first message.

3 Claims, 5 Drawing Sheets

(51) Int. Cl.
*H04N 7/18* (2006.01)
*H04L 9/06* (2006.01)
*H04L 9/08* (2006.01)
*H04L 9/32* (2006.01)

(56) References Cited

U.S. PATENT DOCUMENTS

2019/0312913 A1* 10/2019 Buckley ................. H04L 63/06
2021/0382762 A1* 12/2021 Edamadaka ............... G06F 7/08
2021/0406199 A1* 12/2021 Kounavis .............. G06F 12/063

FOREIGN PATENT DOCUMENTS

KR         102007221 B1     8/2019
KR         102069713 B1     1/2020

* cited by examiner

400

| Type of terminal | Pseudo-random function set $\text{Func}_{pr}=\{f_1, f_2, f_3, f_4, f_5, f_6\}$ | | | | | |
|---|---|---|---|---|---|---|
| NVR | $f_1$ | $f_2$ | $f_3$ | $f_4$ | $f_5$ | $f_6$ |
| Terminal u | $f_{k2}^u$ | $f_{k3}^u$ | $f_{k4}^u$ | $f_{k5}^u$ | $f_{k6}^u$ | $f_{k1}^u$ |
| Terminal t | $f_{k6}^t$ | $f_{k1}^t$ | $f_{k2}^t$ | $f_{k3}^t$ | $f_{k4}^t$ | $f_{k5}^t$ |
| Terminal v | $f_{k5}^v$ | $f_{k6}^v$ | $f_{k1}^v$ | $f_{k2}^v$ | $f_{k3}^v$ | $f_{k4}^v$ |

FIG.4

APPARATUS AND METHOD FOR AUTHENTICATING NETWORK VIDEO RECORDER SECURITY

CROSS-REFERENCE TO RELATED APPLICATION(S)

This application claims priority from and the benefit of Korean Patent Application No. 10-2021-0037196 filed on Mar. 23, 2021, which is hereby incorporated by reference in its entirety.

BACKGROUND

1. Field

Example embodiments of the following description relate to a security authentication apparatus and method for a network video recorder (NVR), and more particularly, to an apparatus and method for ensuring a network security by generating a different independent private key for each message using a pseudo-random function set.

2. Related Art

A network video recorder (NVR) system refers to a surveillance device that digitizes all four elements, for example, a camera, a video, a network recorder, and monitoring, constituting a surveillance system. Also, the NVR system is a system based on high-quality image processing and network processing, controlling the entire system using a keyboard and a mouse. Since the NVR system directly receives and processes a digital image signal from an Internet protocol (IP) network camera, the NVR system may be installed anywhere if a network is present. In this aspect, the NVR system differs from a digital video recorder (DVR) that may not be far away from a camera installation site.

However, an existing NVR may be vulnerable to sniffing of a recorded image on a network link with an individual Internet protocol-closed circuit television (IP-CCTV). Also, in the case of using a public key, a solution for security is required in that an image of remaining lines may be sniffed only with a key leakage through a single vulnerable line among a plurality of lines.

For reference, cited references include patent document 1 that is Korean Patent Registration No. 10-2069713 and patent document 2 that is Korean Patent Registration No. 10-2007221.

A network video record security system for determining a log-in status based on fingerprint information of a user is disclosed in Korean Patent Registration No. 10-2069713. In detail, a configuration in which a management server determines whether to authenticate log-in by comparing user fingerprint information recognized through a mouse-integrated fingerprint recognizer and administrator fingerprint information stored in an NVR is disclosed in the target patent. However, the target patent has a risk that a security issue may arise if fingerprint data of an individual user is leaked from the management server.

SUMMARY

At least one example embodiment provides a security authentication method and apparatus for a network video recorder (NVR) in which a processor included in an NVR assigns a terminal unique index to each of a plurality of pseudo-random functions included in a pseudo-random function set using terminal information, generates an independent private key for authenticating an individual message, and authenticates the corresponding message.

According to an aspect, there is provided a security authentication method of an NVR including a processor and a communicator, the security authentication method including assigning, by the processor, a terminal unique index to each of a plurality of pseudo-random functions included in a pseudo-random function set using terminal information; transmitting, by the communicator, a session key having a predetermined expiry time and the pseudo-random function set with the assigned terminal unique index to a terminal; calculating, by the processor, a first terminal unique index for authenticating a first message using a predetermined bitstream of the first message received from the terminal; selecting, by the processor, a first pseudo-random function for authenticating the first message using the calculated first terminal unique index; generating, by the processor, a first independent private key of the terminal for authenticating the first message by inputting the session key and a media access control (MAC) address of the terminal to the first pseudo-random function; and generating, by the processor, a message authentication code for the first message using the first independent private key and authenticating the first message received from the terminal.

The assigning of the terminal unique index may include one-to-one mapping, by the processor, between each pseudo-random function $f_n$ included in the pseudo-random function set $Func_{pr}$ and a terminal unique index $k^u$ that is defined according to the terminal. Here, n denotes an integer of 1 or more.

The calculating of the first terminal unique index may include calculating the first terminal unique index $k_1^u$ according to the following Equation 1:

$$k_1^u = mod(\Sigma_{i=1}^n p_i, N)$$

Here, $p_i$ denotes an $i^{th}$ bit in the bitstream included in the first message and N denotes a number of pseudo-random functions included in the pseudo-random function set.

The selecting of the first pseudo-random function may include selecting the first pseudo-random function that is mapped to the first terminal unique index $k_1^u$ in the pseudo-random function set $Func_{pr}$.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIG. 4 illustrates an example of a process of assigning, by an NVR, a terminal unique index to each IP-CCTV according to an example embodiment.

DETAILED DESCRIPTION

Figure 1:
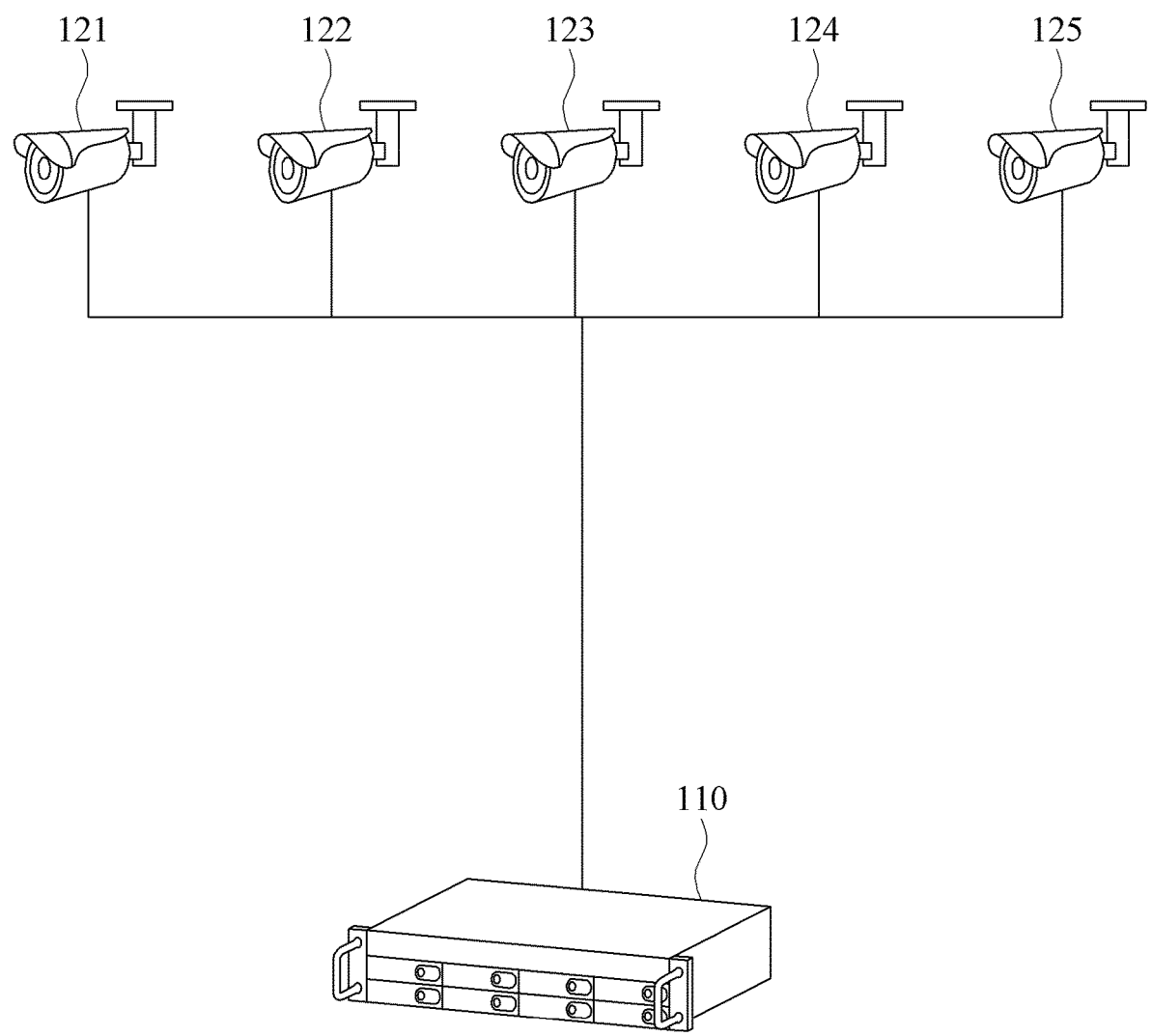
FIG. 1 illustrates an example of an operation relationship between a network video recorder (NVR) and a plurality of Internet protocol-closed-circuit televisions (IP-CCTVs) according to an example embodiment.

Specific structural or functional description related to example embodiments is simply provided as an example only and may be implemented in various modifications. Therefore, the example embodiments are not limited to a specific disclosure and the scope of the present specification includes modifications, equivalents, and replacements included in the technical spirit.

Although the terms "first," "second," etc., may be used herein to describe various components, the components should not be limited by these terms. These terms are only used to distinguish one component from another component. For example, a first component may be termed a second component and, likewise, a second component may be termed a first component.

When a component is referred to as being "connected to" or "accessed to" another component, the component may be directly connected to or accessed to the other component, or one or more other intervening components may be present.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising (incudes/including)," and "has/having" when used in this specification, specify the presence of stated features, integers, steps, operations, elements, and/or components, but do not preclude the presence or addition of one or more other features, integers, steps, operations, elements, components, and/or combination thereof.

Unless otherwise defined, all terms, including technical and scientific terms, used herein have the same meaning as commonly understood by one of ordinary skill in the art to which example embodiments pertains. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings. Here, repeated description is omitted.

FIG. 1 illustrates an example of an operation relationship between a network video recorder (NVR) and a plurality of Internet protocol-closed-circuit televisions (IP-CCTVs) according to an example embodiment. Referring to FIG. 1, an NVR 110 may be connected to each of a plurality of IP-CCTVs 121, 122, 123, 124, and 125 through a communication network. Each of the IP-CCTVs 121, 122, 123, 124, and 125 may be installed in a target area to be monitored and may transmit captured image data to the NVR 110 through the communication network.

The NVR 110 may store image data transmitted from the plurality of IP-CCTVs 121, 122, 123, 124, and 125 and may display pre-stored image data or image data captured in real time by a single IP-CCTV in response to a user interaction.

Conventionally, a secure shell (SSH) protocol or a key-based encryption technique is used for encryption in a data communication process between the NVR 110 and the plurality of IP-CCTVs 121, 122, 123, 124, and 125. However, in the case of a conventional encryption technique, a risk of information leakage may increase if a key of a single vulnerable line among n lines is leaked or if a key is leaked by an insider. Hereinafter, a security authentication method of an NVR that guarantees security of remaining lines although a single line is exposed is described based on a key allocation algorithm based on an individual media access control (MAC) address of an IP-CCTV.

Figure 2:
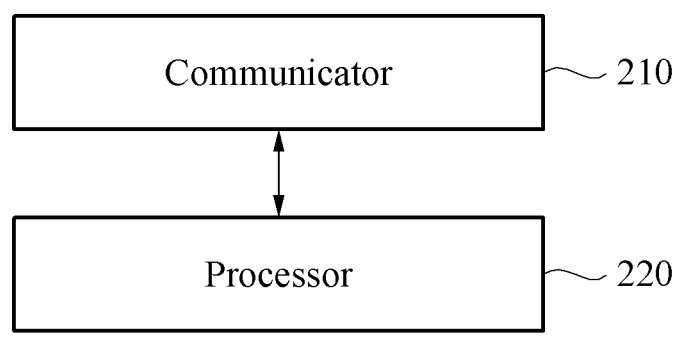
FIG. 2 is a diagram illustrating an NVR according to an example embodiment.

FIG. 2 is a diagram illustrating an NVR according to an example embodiment. Referring to FIG. 2, an NVR 200 may include a communicator 210 and a processor 220. The processor 220 may assign a terminal unique index to each of a plurality of pseudo-random functions included in a pseudo-random function set using terminal information of an IP-CCTV connected to the NVR 200. In the following description, the pseudo-random function refers to a function that outputs a random number arbitrarily selected based on an input seed value. A process of assigning, by the processor 220, a terminal unique index to each of a plurality of pseudo-random functions based on terminal information of each IP-CCTV is further described with reference to FIG. 4.

The communicator 210 may be implemented in a form of a communication module that includes a communication interface. For example, the communication interface may include a wireless Internet interface, such as a wireless local area network (WLAN), Wireless Fidelity (WiFi) Direct, digital living network alliance (DLNA), wireless broadband (WiBro), World Interoperability for Microwave Access (WiMAX), and high speed downlink packet access (HSDPA), and a short range communication interface, such as Bluetooth™, radio frequency identification (RFID), infrared data association (IrDA), ultra wideband (UWB), ZigBee, and near field communication (NFC). In addition, the communication interface may refer to any type of interfaces, for example, a wired interface, capable of communicating with an outside.

The communicator 210 may transmit a session key having a predetermined expiry time and the pseudo-random function set with the assigned terminal unique index to an IP-CCTV that attempts an access request. Also, the communicator 210 may receive, from a specific IP-CCTV, a data packet that includes a first message including specific image data.

In this case, the processor 220 may calculate a first terminal unique index for authenticating a first message using a predetermined bitstream of the first message received from a terminal. Also, the processor 220 may select a first pseudo-random function for authenticating the first message using the calculated first terminal unique index from the pseudo-random function set that is shared in advance.

The processor 220 may generate a first independent private key for authenticating the first message by inputting, to the first pseudo-random function, the session key and a MAC address of the IP-CCTV that has transmitted the first message. Also, the processor 220 may generate a message authentication code for the first message using the first independent private key and may authenticate the first message through comparison with a message authentication code received from the IP-CCTV. Therefore, the NVR 200 may perform authentication regarding whether a request message or image data received from an individual IP-CCTV is received from a corresponding predetermined IP-CCTV.

Figure 3:
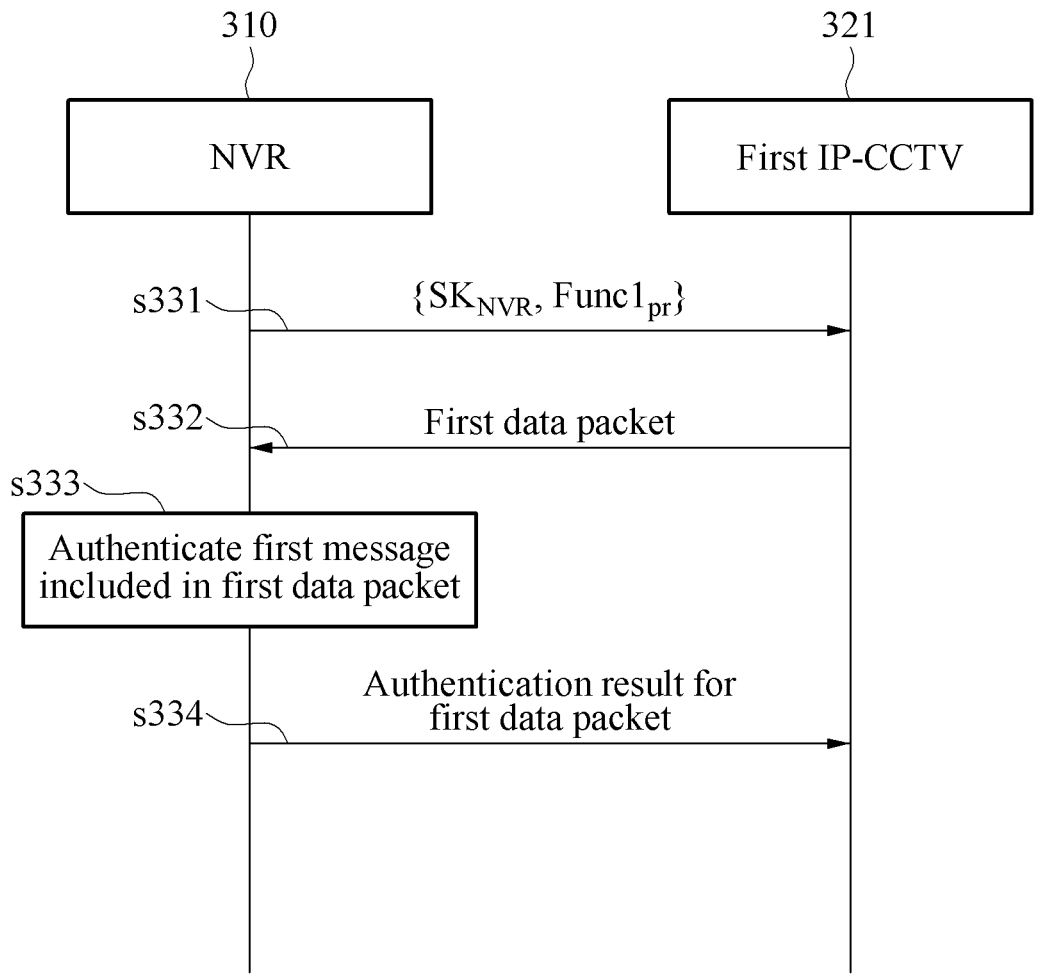
FIG. 3 illustrates an example of a communication process for transmitting and receiving a message between an NVR and a single IP-CCTV according to an example embodiment.

FIG. 3 illustrates an example of a communication process for transmitting and receiving a message between an NVR and a single IP-CCTV according to an example embodiment. A data communication process between an NVR 310 and a first IP-CCTV 321 is described with reference to FIG. 3. Although not illustrated in FIG. 3, the NVR 310 may receive a message for an access request from an IP-CCTV connected through a communication network. Also, the NVR 310 may authenticate a user for the IP-CCTV by authenticating user information, for example, ID information and password information, delivered from the IP-CCTV. In this case, the NVR 310 may assign a terminal unique index to each of a plurality of pseudo-random functions included in a pseudo-random function set $Func_{pr}$ using terminal information about the first IP-CCTV 321 that transmits an access request message. For example, the terminal information may be MAC information assigned to an IP-CCTV. Also, the terminal information available in this process may be information capable of uniquely identifying each of IP-CCTVs connected to the NVR 310, such as a universally unique identifier (UUID).

In detail, a processor included in the NVR 310 may one-to-one map between each pseudo-random function $f_n$ included in the pseudo-random function set $Func_{pr}$ and a terminal unique index $k^u$ that is defined according to a terminal. Here, n denotes an integer of 1 or more. A process of assigning, by the NVR 310, a terminal unique index to each of the plurality of pseudo-random functions $f_n$ is further described with reference to FIG. 4. Here, n denotes an integer of 1 or more.

FIG. 4 illustrates an example of a process of assigning, by an NVR, a terminal unique index to each IP-CCTV according to an example embodiment. Referring to FIG. 4, a terminal unique index of each pseudo-random function $f_n$ included in a pseudo-random function set $Func_{pr}$ within a storage device of an NVR may be stored in a look-up table 400.

For example, the NVR may be connected to three IP-CCTVs including a terminal u, a terminal t, and a terminal v. Also, a case in which the NVR uses six pseudo-random functions for encryption in a data communication process is described. A number of pseudo-random functions or a number of terminals is provided as an example only for understanding and should not be understood to limit or restrict another example embodiment.

In this case, the NVR may randomly distribute terminal unique indices for six pseudo-random functions included in the pseudo-random function set $Func_{pr}=\{f_1, f_2, f_3, f_4, f_5, f_6\}$ for the terminal u in arbitrary order of 6→1→2→3→4→5. In more detail, terminal unique indices for the terminal u may be defined as $k_1^u=6$, $k_2^u=1$, $k_3^u=2$, $k_4^u=3$, $k_5^u=4$, and $k_6^u=5$. Based on the above principle, the NVR may distribute arrangement of terminal unique indices for the six pseudo-random functions for the terminal t in 2→3→4→5→6→1. In this case, terminal unique indices for the terminal t may be defined as $k_1^t=2$, $k_2^t=3$, $k_3^t=4$, $k_4^t=5$, $k_5^t=6$, and $k_6^t=1$. Also, the NVR may distribute arrangement of terminal unique indices for the terminal v to six pseudo-random functions in 3→4→5→6→1→2. In this case, the terminal unique indices for the terminal v may be defined as $k_1^v=3$, $k_2^v=4$, $k_3^v=5$, $k_4^v=6$, $k_5^v=1$, and $k_6^v=2$.

A processor included in the NVR may one-to-one map between each pseudo-random function $f_n$ included in the pseudo-random function set $Func_{pr}$ and a terminal unique index $k^u$ that is defined according to a terminal. Here, n denotes an integer of 1 or more.

According to an example embodiment, the processor of the NVR may generate a reference number based on terminal information of the terminal u. For example, the terminal information may be a MAC address or a UUID corresponding to the terminal u. The processor generates a reference number present within the terminal unique index range, for example, an integer between 1 and 6, by performing a predetermined operation for the terminal information. The processor may assign a largest index within the terminal unique index range to a sequence number corresponding to the reference number. For example, when a reference number of the terminal u is determined as 1, the processor may determine the reference number as $k_1^u=6$. Also, the processor may assign reference number 1 of the terminal u to sequence number 6 corresponding to the largest index as terminal unique index $k_6^u=1$.

Here, the processor arbitrarily assigns a terminal unique index by exchanging sequence numbers ($k_2^u$, $k_3^u$, $k_4^u$, $k_5^u$, $k_6^u$) of remaining terminal unique indices excluding the terminal unique index corresponding to the reference number with corresponding terminal unique indices (2, 3, 4, 5, 1) a predetermined number of times. In detail, if ($k_2^u$, $k_3^u$) is determined for a first exchange, sequence numbers of remaining terminal unique indices excluding the terminal unique index corresponding to the reference number are ($k_2^u$, $k_3^u$, $k_4^u$, $k_5^u$, $k_6^u$) and terminal unique indices corresponding to the respective corresponding sequence numbers are (3, 2, 4, 5, 1) and the entire terminal unique indices are (6, 3, 2, 4, 5, 1). In this manner, the processor performs randomization by exchanging a sequence number of each of terminal unique indices with a corresponding index number a predetermined number of times.

An NVR according to an example embodiment may set an index for selecting a specific pseudo-random function within a pseudo-random function set to be different for each IP-CCTV. Since a reference number used in a process of randomizing a terminal unique index is calculated from terminal information, for example, a MAC address, of each IP-CCTV, randomness of terminal unique index arrangement corresponding to each IP-CCTV may be strengthened. In the aforementioned manner, although a pseudo-random function set is exposed by another terminal present within a network in a data communication process, security of remaining IP-CCTVs in communication with different terminal unique indices may be guaranteed.

The data communication process between the NVR 310 and the first IP-CCTV 321 is further described with reference again to FIG. 3. In operation s331, a communicator of the NVR 310 may transmit, to the first IP-CCTV 321, a session key $SK_{NVR}$ having a predetermined expiry time and a pseudo-random function set $Func1_{pr}$ to which the terminal unique index is assigned. As described above, when a second IP-CCTV requests an access, the NVR 310 may transmit, to the second IP-CCTV, a second pseudo-random function set $Func2_{pr}$ to which a new terminal unique index is assigned.

In operation s332, the first IP-CCTV 321 may transmit a first data packet to the NVR 310. In operation s333, a processor of the NVR 310 may perform authentication on a first message included in the first data packet. In operation s334, the communicator of the NVR 310 may transmit an authentication result for the first data packet to the first IP-CCTV 321. Hereinafter, a process of authenticating the NVR 310 is further described with reference to FIG. 5.

Figure 5:
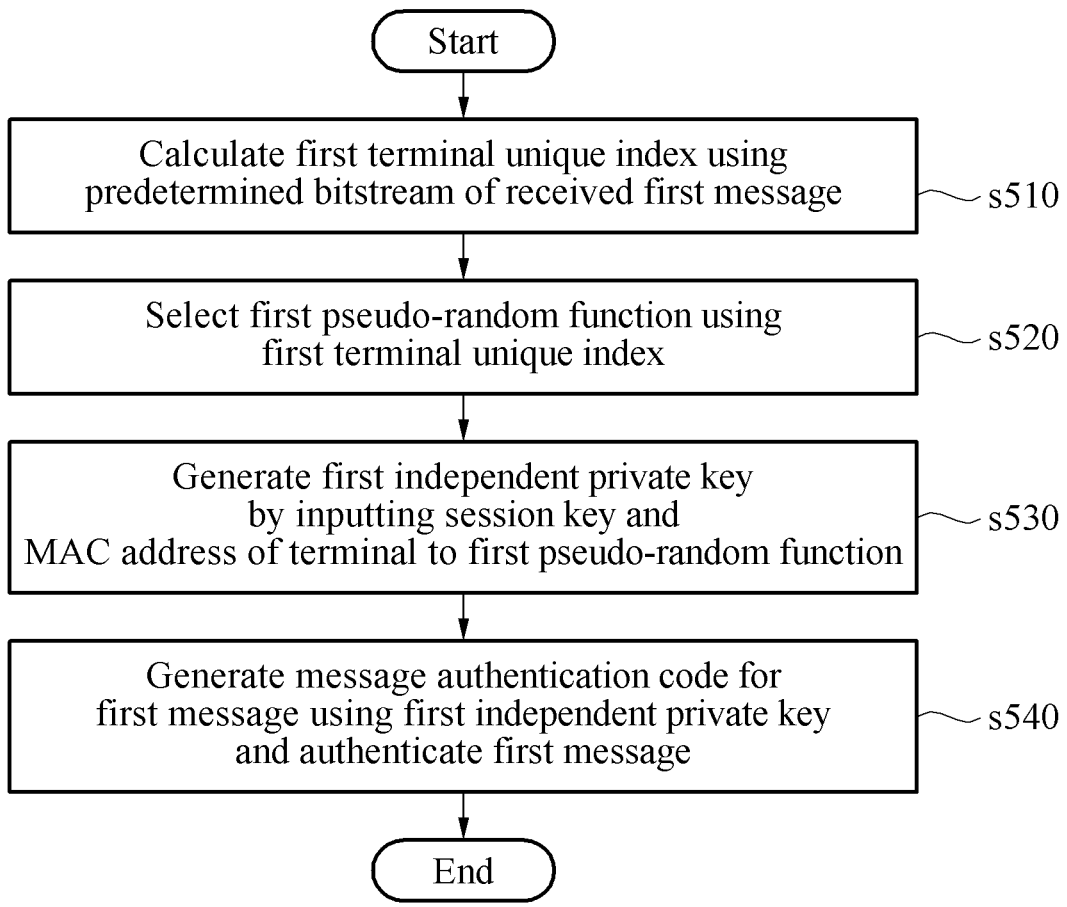
FIG. 5 illustrates an example of a process of authenticating, by an NVR, a received first message according to an example embodiment.

FIG. 5 illustrates an example of a process of authenticating, by an NVR, a received first message according to an example embodiment. A method 500 of authenticating, by an NVR, a received first message may include operation s510 of calculating a first terminal unique index using a predetermined bitstream of the received first message, operation s520 of selecting a first pseudo-random function using the first terminal unique index, operation s530 of generating a first independent private key by inputting a session key and a MAC address of the terminal to the first pseudo-random function, and operation s540 of generating a message authentication code for the first message using the first independent private key and authenticating the first message.

In operation s510, a processor included in the NVR may calculate the first terminal unique index using the predetermined bitstream of the first message received from the terminal. In detail, the processor may calculate the first terminal unique index $k_1''$ according to the following Equation 1.

$$k_1''=\mathrm{mod}(\Sigma_{i=1}^{n}p_i,N) \quad [\text{Equation 1}]$$

In Equation 1, $p_i$ denotes an $i^{th}$ bit in the bitstream included in the first message and N denotes a number of pseudo-random functions included in the pseudo-random function set. Here, n denotes an integer of 1 or more. In detail, the processor of the NVR may calculate the first terminal unique index $k_1''$ using a remainder acquired by dividing a sum of bit values of promised bitstreams in a data packet through which image data is transmitted during a predetermined period of time by a number of pseudo-random functions included in the pseudo-random function set. For example, if the remainder is 0, the processor may determine $k_1''$ as N.

In operation s520, the processor may select the first pseudo-random function that is mapped to the first terminal unique index $k_1''$ within the pseudo-random function set $\mathrm{Func}_{pr}$.

In operation s530, the processor may generate the first independent private key by inputting the session key and the MAC address of the terminal to the selected first pseudo-random function. In the example embodiment, an independent private key denotes a value that is used as an input value of a hash value for generating a message authentication code and also is shared between the IP-CCTV and the NVR and thereby used for security of data communication.

In operation s540, the processor of the NVR may generate the message authentication code for the first message using the first independent private key. The processor of the NVR may authenticate the first message by comparing the calculated message authentication code to a message authentication code received from the IP-CCTV. In detail, when the message authentication code received from the IP-CCTV and the calculated message authentication code match, the processor of the NVR may authenticate that the corresponding message is transmitted from the corresponding predetermined IP-CCTV. A process of generating a message authentication code by inputting an independent private key to a hash function is evident to an expert in the field and thus, further description is omitted.

An independent private key according to an example embodiment may be newly set per data communication based on a bit value of a message transmitted from an IP-CCTV to an NVR, which may lead to enforcing security of data communication. For example, although an independent private key of specific order is exposed, a new independent private key may be regenerated using a message of subsequent order and calculation may be performed. Therefore, it is possible to minimize an information leakage probability by an intruder.

The example embodiments described herein may be implemented using hardware components, software components, and/or a combination thereof based on the example embodiments. For example, the apparatuses, the methods, and the components described in the example embodiments may be implemented using at least one general-purpose computer or special-purpose computer, for example, a processor, a controller, an arithmetic logic unit (ALU), a digital signal processor, a microcomputer, a field programmable gate array (FPGA), a programmable logic unit (PLU), a microprocessor, and other devices capable of executing and responding to instructions in a defined manner, other devices configured to process electronic devices, and combinations thereof. The processing device may run an operating system (OS) and one or more software applications that run on the OS. Also, the processing device may access, store, manipulate, process, and create data in response to execution of the software. For purpose of simplicity, the description of a processing device is used as a singular; however, one skilled in the art will appreciate that the processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

What is claimed is:

1. A security authentication method of a network video recorder (NVR) comprising a processor and a communicator, the security authentication method comprising:

assigning, by the processor, a terminal unique index to each of a plurality of pseudo-random functions included in a pseudo-random function set using terminal information;

transmitting, by the communicator, a session key having a predetermined expiry time and the pseudo-random function set with the assigned terminal unique index to a terminal;

calculating, by the processor, a first terminal unique index for authenticating a first message using a predetermined bitstream of the first message received from the terminal;

selecting, by the processor, a first pseudo-random function for authenticating the first message using the calculated first terminal unique index;

generating, by the processor, a first independent private key of the terminal for authenticating the first message by inputting the session key and a media access control (MAC) address of the terminal to the first pseudo-random function; and generating, by the processor, a message authentication code for the first message using the first independent private key and authenticating the first message received from the terminal.

2. The security authentication method of claim 1, wherein the assigning of the terminal unique index comprises one-to-one mapping, by the processor, between each pseudo-random function $f_n$ included in the pseudo-random function set $Func_{pr}$ and a terminal unique index $k^u$ that is defined according to the terminal, n denoting an integer of 1 or more.

3. The security authentication method of claim 2, wherein the calculating of the first terminal unique index comprises calculating the first terminal unique index $k_1^u$ according to the following Equation 1:

$$k_1^u = \mathrm{mod}(\Sigma_{i=1}^n p_i, N)$$

where $p_i$ denotes an $i^{th}$ bit in the bitstream included in the first message and N denotes a number of pseudo-random functions included in the pseudo-random function set, and the selecting of the first pseudo-random function comprises selecting the first pseudo-random function that is mapped to the first terminal unique index $k_1^u$ in the pseudo-random function set $Func_{pr}$.

* * * * *